United States Patent [19]

Perry et al.

[11] Patent Number: 4,558,182
[45] Date of Patent: * Dec. 10, 1985

[54] REMOTELY-ACTIVATED SWITCHING APPARATUS

[75] Inventors: Steven B. Perry, Highlands; Joseph Miller, Oakhurst, both of N.J.

[73] Assignee: Keptel, Inc., Ocean, N.J.

[*] Notice: The portion of the term of this patent subsequent to Aug. 20, 2002 has been disclaimed.

[21] Appl. No.: 667,423

[22] Filed: Nov. 1, 1984

Related U.S. Application Data

[63] Continuation of Ser. No. 519,410, Aug. 1, 1983, abandoned.

[51] Int. Cl.⁴ .............................................. H04B 3/46
[52] U.S. Cl. ............................ 179/81 R; 179/175.3 R
[58] Field of Search ......... 179/81 R, 175.3 R, 175.3 F

[56] References Cited

U.S. PATENT DOCUMENTS

| Re. 29,499 | 12/1977 | Spencer | 179/175.3 |
|---|---|---|---|
| 3,636,280 | 1/1972 | Wetzel | 179/175.3 |
| 3,725,589 | 4/1973 | Golden | 179/6 |
| 3,725,613 | 4/1973 | Allen et al. | 179/175.3 |
| 3,739,107 | 6/1973 | Spencer | 179/175.3 |
| 3,766,336 | 10/1973 | Wikholm | 179/175.3 |
| 3,773,986 | 11/1973 | Tremblay | 179/175.3 |
| 3,814,870 | 6/1974 | Miller | 179/175.2 |
| 3,829,616 | 8/1974 | Blouch | 179/2 |
| 3,843,848 | 10/1974 | Cox | 179/175.3 |
| 3,849,764 | 11/1974 | Wang et al. | 340/171 |

(List continued on next page.)

OTHER PUBLICATIONS

Advertisement of Proctor for Line Test Unit (LTU).
Advertisement of TII Industries for Combination Tip Party Identifier and Ringer Isolator, Issue Nos. 3 and 7, Aug. 1982.
Advertisement of TII Industries for TII-815 Tip Party Identifier Issue No. 4, Aug. 1982.
Advertisement of TII Industries for TII-811 Tip Party Identifier Issue No. 4, Aug. 1982.
Advertisement of TII Industries for TII 855 Super Fire Fly Isolation Device, Issue No. 1, Aug. 1982.
Advertisement of TII Industries for TII 810 3 Ringer Isolator (U.S. Pat. No. 4,209,667), Issue No. 3, Aug. 1982.
Advertisement of TII Industries for TII 805 Remote Isolation Device (Time Release) Issue No. 6, Oct. 1981.
Advertisement of TII Industries for Remote Isolation Devices and Line Termination Devices.
Advertisement for Cidcomm International for Remote Line Disconnectors, Bulletin No. 1005.

*Primary Examiner*—James L. Dwyer
*Attorney, Agent, or Firm*—Kenyon & Kenyon

[57] ABSTRACT

Apparatus is disclosed for disconnecting and reconnecting equipment to a telephone line in response to at least one signal sent over the telephone line. The apparatus includes a voltage threshold circuit, a voltage regulator circuit, a current chargeable element such as a capacitor, a discharge circuit, a switch and a switch control. The switch is coupled to the telephone line and to the equipment and disconnects the equipment from the line in response to the signal sent over the line. The threshold circuit is coupled to the line and receives the signal. It provides an output signal to the regulator circuit only when the signal on the line exceeds a threshold voltage level. The voltage regulator circuit regulates the voltage at the output of the threshold circuit and provides a substantially constant voltage to the chargeable element. Since the voltage applied to the chargeable element is known, the time required to charge the chargeable element can be precisely determined. The chargeable element is coupled to the discharge circuit which causes the chargeable element to discharge when the signal to the threshold circuit falls below the threshold value, for example, when the signal is removed. The switch control is coupled to the discharge circuit and maintains the switch in a switched, equipment-disconnected condition while the chargeable element is discharging.

5 Claims, 5 Drawing Figures

U.S. PATENT DOCUMENTS

| | | | |
|---|---|---|---|
| 3,852,537 | 12/1974 | Vincent | 179/17 |
| 3,860,769 | 1/1975 | Pachynski, Jr. | 179/175.3 |
| 3,867,588 | 2/1975 | Pickens et al. | 179/175.3 |
| 3,902,016 | 8/1975 | Blouch | 179/2 |
| 3,912,882 | 10/1975 | Beerbaum | 179/175.3 |
| 3,919,487 | 11/1975 | Gabrielson | 179/17 |
| 3,920,935 | 11/1975 | Vierling et al. | 179/175.3 |
| 3,922,508 | 11/1975 | Brady | 179/175.3 |
| 3,943,305 | 3/1976 | Hagedorn | 179/175.3 |
| 3,947,753 | 3/1976 | Gushima et al. | 323/21 |
| 4,041,255 | 8/1977 | Cambridge et al. | 179/175.3 |
| 4,054,759 | 10/1977 | McGrath et al. | 179/175.3 |
| 4,068,104 | 1/1978 | Werth et al. | 179/175.3 |
| 4,070,554 | 1/1978 | Rule et al. | 179/175.3 |
| 4,086,448 | 4/1978 | Anglikowski | 179/175.3 |
| 4,112,414 | 9/1978 | Iscol et al. | 340/146.1 |
| 4,126,771 | 11/1978 | Proctor et al. | 232/175.3 |
| 4,143,250 | 3/1979 | Simokat | 179/175.3 |
| 4,169,220 | 9/1979 | Fields | 179/175.3 |
| 4,197,435 | 4/1980 | Jackson et al. | 179/175.3 |
| 4,209,667 | 6/1980 | Simokat | 179/17 |
| 4,258,236 | 3/1981 | Conklin et al. | 179/175.3 |
| 4,304,967 | 12/1981 | Gretczko | 179/2 |
| 4,350,849 | 9/1982 | Ahuja | 179/175 |

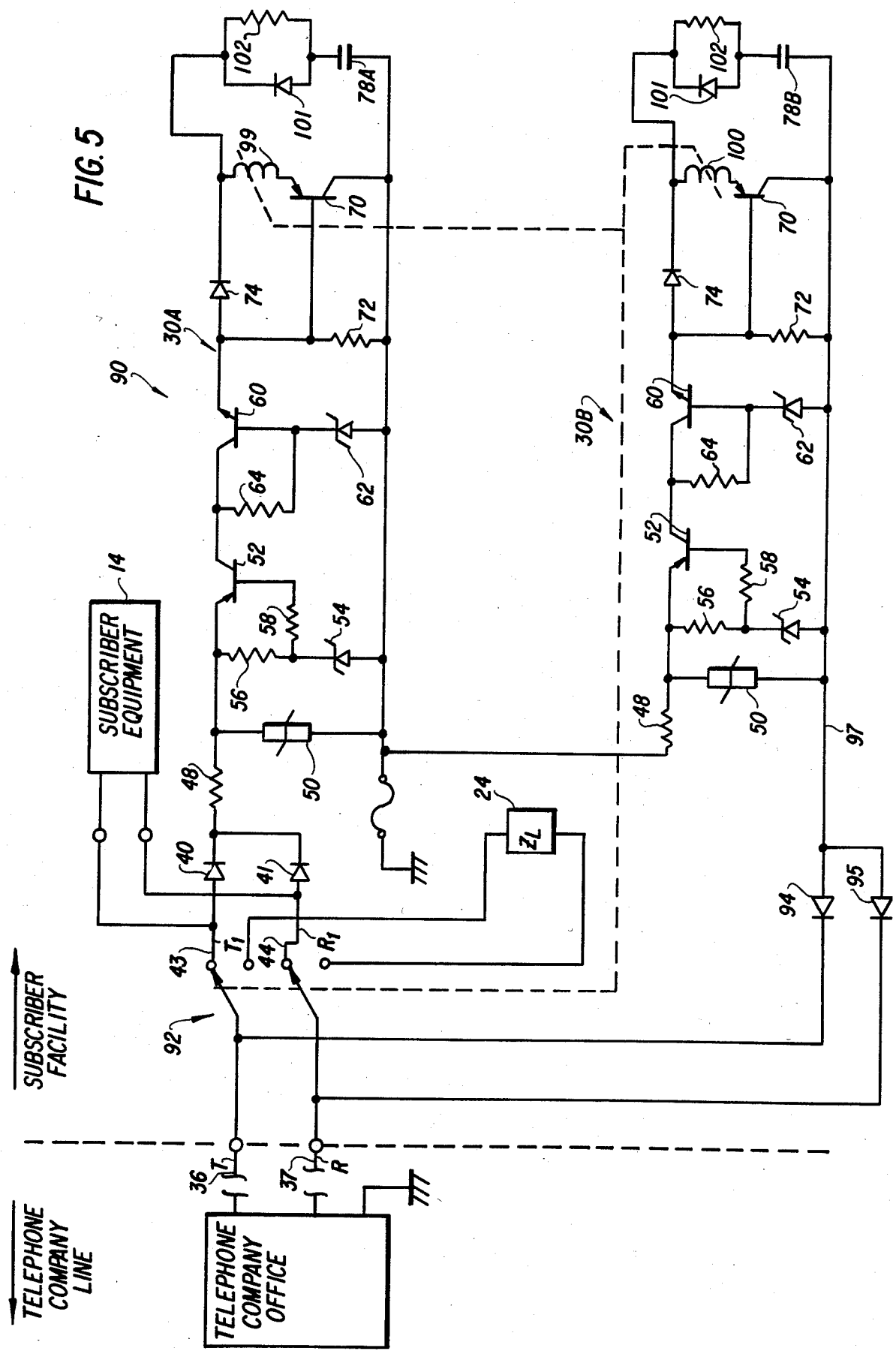

REMOTELY-ACTIVATED SWITCHING APPARATUS

This is a continuation of application Ser. No. 519,410 filed Aug. 1, 1983, now abandoned.

BACKGROUND OF THE INVENTION

The present invention relates to apparatus disposed at a first location and activated from a second location over a link betwen the first location and the second location. The apparatus to which the present invention relates can include switch means whose switching state is changed when the apparatus is activated over the link. The switch means can be used to disconnect equipment from and/or connect equipment to the link at the first location. More particularly, the present invention relates to apparatus disposed at a subscriber's facility activated from a communication company office over a line linking the communication company office and the subscriber so as to disconnect and/or connect the line and the subscriber's equipment.

Apparatus connected to a telephone line at a subscriber's facility for the purpose of disconnecting subscriber equipment from the line and/or connecting further apparatus to the line in response to a signal sent over the telephone line from a telephone company office are known and are referred to as remote isolation or disconnect devices, line testers, and other terms. The signal sent from the telephone company office can be DC, pulsed or AC, or combinations thereof. Some apparatus will disconnect subscriber equipment from the line in response to the signal sent over the line and then automatically reconnect the equipment to the line after the elapse of a controlled time period, which can be measured, for example, from the time of application or removal of the signal, or from the time of disconnecting the equipment. Some apparatus will maintain the subscriber's equipment disconnected until another signal is sent over the telephone line from the telephone company office to reconnect the subscriber's equipment. During the time that the subscriber's equipment is disconnected from the telephone line by apparatus of the type described above, the telephone line up to the subscriber's facility can be tested remotely from a telephone company office. Apparatus of the type described above can terminate the telephone line at the subscriber's facility with a specified impedance including a short or open circuit to provide a known passive signature in place of the subscriber's equipment. It is also known to couple active circuits such as tone generators to the telephone line in place of the subscriber's equipment.

Many of the known apparatus of the type described above which temporarily disconnect and automatically reconnect the subscriber's equipment within a controlled time period include an energy storage device such as a capacitor which is caused to charge or discharge by or in response to a signal sent from the telephone company office. U.S. Pat. Nos. 3,725,613 (Allen et al.), 3,773,986 (Tremblay), 4,054,759 (McGrath et al.), 4,143,250 (Simokat) and 4,169,220 (Fields) all disclose remotely activated apparatus which includes a capacitor charged and/or discharged by or in response to a signal sent from a telephone company office. U.S. Pat. No. 3,867,588 (Pickens et al.) discloses remotely activated apparatus which includes a battery charged by a signal sent from a telephone company office. The charging or discharging capacitor (or battery) causes a switch to change its switching state and disconnect the subscriber's equipment. Thereafter, upon the discharging or charging of the capacitor (or battery), which occurs automatically within some controlled time period after the initial application or subsequent removal of the telephone company activating signal, the switch reverts to its original state to reconnect the subscriber's equipment.

The telephone company coin collection (+130 v DC) or coin return (−130 v DC) voltage can be used as the activating signal, as known, as well as other telephone company signals which may be generated at a telephone company test desk.

The capacitor (or battery) can be charged from the telephone signal (as, for example, in the Fields U.S. Pat. No. 4,169,220 and Pickens et al. U.S. Pat. No. 3,867,588) or from a power source typically provided as part of the apparatus disposed at the subscriber's facility (as, for example, in the Tremblay U.S. Pat. No. 3,773,986). Heretofore, in remotely-activated apparatus which utilized the energy from a telephone company signal to charge a capacitor, the time that the telephone company signal had to be applied to the apparatus in order to charge the capacitor so that the switch would be maintained in a switched state for a given time could not be accurately determined because of variations in the telephone company signal itself, telephone line conditions and circuit components in the apparatus. In addition, because of variations in the telephone company signal, telephone line conditions and circuit components, the time that the switch would be maintained in the switched state also could not be accurately determined.

While a prior art system which utilized a battery or other power source for charging the capacitor might provide some improvement in determining switching time, batteries have the disadvantage of limited life and output variations with age and environmental conditions, and the use of batteries or other power sources adds to the expense of the apparatus, particularly batteries which have to be replaced periodically if reliability is to be assured.

In the Pickens et al. U.S. Pat. No. 3,867,588, a battery is charged by a telephone company signal for a predetermined time. Upon removal of the telephone company signal, the battery discharges through a relay coil which controls a switch coupling a telephone line to a subscriber. While it might to possible to charge the battery to a generally known potential by controlling the length of time that the telephone company signal is applied, the magnitude of the telephone company signal which the battery receives is subject to changes caused by conditions on the line linking the telephone company office and the subscriber. Thus, the battery may not be charged by a precisely known voltage and the voltage which charges the battery may not be the same from activation to activation. Therefore, the discharge time may not be precisely determined and may not be repeatable from activation to activation. As mentioned above, the inclusion of a battery in a remotely activated apparatus adds to the expense of the tester and can reduce the reliability of the tester.

In U.S. Pat. No. 3,852,537 (Vincent), two capacitors which are discharged through different relay coils to connect and disconnect subscriber equipment from a telephone line are charged by a signal regulated by a zener diode. However, the charging signal is the line voltage normally present on the telephone line rather than a selectively applied signal so that charging time of the capacitors is as a general matter not a concern.

Some known apparatus of the type described above which disconnect the subscriber's equipment in response to a first signal sent over the telephone line and maintain the equipment disconnected until a second signal is sent over the telephone line include a relay or other device which is latched in response to the first signal and unlatched in response to the second signal. For example, in U.S. Pat. Nos. 3,919,487 (Gabrielson), 4,041,255 (Cambridge et al.) and 4,126,771 (Proctor et al.), and the Vincent U.S. Pat. No. 3,852,537, a latching relay is utilized as the latching device and in U.S. Pat. No. 4,258,236 (Conklin et al.) a latching circuit is used as the latching device. However, apparatus disclosed in these patents which disconnected or reconnected the subscriber's equipment in response to a particular signal, also had the drawback that the precise time necessary to apply the particular signal to effect a disconnect or reconnect could not accurately be determined and/or was not accurately repeatable.

The present invention provides improved remotely-activated apparatus which does not suffer from the aforementioned drawbacks.

OBJECTS AND SUMMARY OF THE INVENTION

It is the object of the present invention to provide an improved remotely-activated apparatus.

It is another object of the present invention to provide an improved remotely-activated switching apparatus.

It is another object of the present invention to provide an improved remotely-activated switching apparatus in which times associated with switching are accurately determinable.

It is another object of the present invention to provide an improved remotely-activated switching apparatus in which a switch in the apparatus when remotely activated is switched to a temporary switch condition in which it is maintained after removal of the activating signal and then automatically switched back to a normal switching condition.

It is another object of the present invention to provide a remotely-activated switching apparatus of the type described in the immediately preceding paragraph in which the time the switch is maintained in the temporary switch condition can be accurately set.

It is another object of the present invention to provide an improved remotely-activated switching apparatus in which a switch in the apparatus when remotely activated is switched to a switch condition in which it is maintained until remotely activated again to return the switch to its former switch condition.

It is another object of the present invention to provide remotely activated switching apparatus which are simple and inexpensive, have a minimal number of components, are rugged, and have increased reliability.

The above and other objects are achieved by the invention disclosed herein according to which an accurately determinable and repeatable signal, e.g. a constant signal or a signal with a constant effective valve, etc., is applied as an energizing signal to an energy storage means in response to a signal sent from a remote location ("remote signal") to control a remotely-activated apparatus. Since characteristics of the energy storage means are known and the value of the energizing signal applied to the energy storage means is known, the time period necessary to energize the energy storage means to an accurately known and repeatable level and/or the time period necessary to energize the energy storage means to the highest level possible, given the energizing signal applied to the energy storage means and the characteristics of the energy storage means, can be accurately determined. As a result times associated with controlling, e.g. activating and/or de-activating, the apparatus in response to the remote signal can be determined with repeatable accuracy.

In turn, where the energizing signal applied to the energizing means is derived from the remote signal, the length of time that the remote signal must be applied in order to provide an energizing signal of a given time can also be determined with repeatable accuracy.

The energy storage means can thereby be energized to an accurately known and repeatable level so that times associated with activating and/or deactivating the apparatus can be accurately determined and set. The remote signal therefore need be applied only for a period of time which can be determined with precision, thereby avoiding instances where the remote signal may be prematurely withdrawn or maintained longer than necessary. The invention is therefore particularly well suited to be used in an automated system in which the remote signal is sequentially applied automatically to a number of lines for a given time period to each line.

According to one aspect of the invention, the energy storage means temporarily activates the apparatus in response to the remote signal, i.e. activates the apparatus for a period of time in which the energizing means is being deenergized after which the apparatus is automatically deactivated. Since the energy storage means can be energized to a given, known repeatable level, as discussed above, it can be de-energized in a known repeatable time period. Thus, the temporary period of time in which the apparatus is activated can be determined with repeatable accuracy. In addition, the value of the signal applied to the energizing means, and/or the energizing means, and/or means for de-energizing the energizing means can be selected to provide predetermined time periods for one or more of the following: energizing time (application of the energizing signal), de-energizing time (temporary activation) and time period of application of remote signal. Activation of the apparatus is meant in a broad sense in that the condition of the apparatus is changed during the activation period. Thus, apparatus when activated can be changed from an active to a passive state.

In accordance with another aspect of the invention, the apparatus when activated is maintained activated until another signal is sent from the remote location to deactivate the apparatus. The time periods relating to application of the remote activating and de-activating signals, and the application of the energizing signal for either activation or deactivation can be accurately determined. Also, the time period required from the start of de-energization of the energizing means to activation or deactivation can also be accurately determined.

According to one aspect, the invention provides apparatus adapted to be coupled to a link or line such as a telephone line and the like to connect or disconnect equipment and the line in response to a signal transmitted on the line from a location remote from the location at which the apparatus is located. The apparatus comprises: switch means coupled to the line and to the equipment so as to connect and disconnect the line and the equipment in respective switching states of the switch means; energy storage means; and regulator means having an input coupled to receive the signal from the remote location ("remote signal") and provide a predetermined substantially constant signal, e.g. voltage and/or current, to the energy storage means. Switch means and switch are used herein in a broad sense and can be an electro-mechanical device which disconnects and connects its terminals or a device such as a solid state switch which disconnects and connects by changing the impedence between its terminals. The switch means also includes means for de-energizing the energy storage means in a predetermined time period when the energy, e.g. voltage or current, available from the storage means exceeds the energy available from the regulator means. The switch means is coupled to the de-energizing means and is in one of the two states when the storage means is de-energizing through the de-energizing means and in the other of the two states when the storage means is not de-energizing through the de-energizing means. The switch means can comprise means for controlling switching which are coupled to the de-energizing means.

Since the regulator means provides a substantially constant signal, within limits of variation, from the remote signal over relatively large variations of the remote signal, the storage means will energize at a known rate substantially regardless of variations, within limits, of the remote signal and will not commence to de-energize when the remote signal, within limits, falls.

Preferably the apparatus includes threshold means coupled to the line directly or through the switch means for providing a signal to the regulator means when the remote signal exceeds a threshold value and substantially no signal when the remote signal is less than the threshold value, the magnitude of the signal provided by the threshold means being equal to or greater than a predetermined value.

In accordance with an aspect of the invention in which the apparatus is maintained activated until another remote signal is received, apparatus substantially as described above is duplicated. One portion of the duplicative apparatus activates the apparatus in response to a remote signal and the other portion de-activates the apparatus in response to another remote signal. The duplicative apparatus portions are connected essentially in parallel with one of the portions always being connected to the line at the remote location.

In accordance with a preferred embodiment, the energy storage means comprises a capacitor, the regulator means is a voltage regulator circuit and the threshold means is a voltage threshold circuit. According to other embodiments, the energy storage device could be a battery. Still other embodiments of the invention can use dual circuits of the foregoing, i.e. inductance and current-controlling circuits.

Further in accordance with a preferred embodiment, the switch means comprises a relay having a coil coupled in the de-energizing means through which current from a discharging of the capacitor flows. The de-energizing means preferably includes a switching element having a high impedance when the voltage across the de-energization means is less than the substantially constant voltage supplied by the regulator circuit and a lower impedance when the voltage across the de-energizing means is greater, preferably by a predetermined amount, than the substantially constant voltage. Means are provided for maintaining the switching element in its high impedance state when the voltage across the capacitor is less than the voltage of the regulator circuit and for maintaining the switching element in its low impedance state when the voltage across the capacitor exceeds the voltage across the regulator circuit. Such means is capable of operating to maintain the switching element in one of its switch states, e.g. low impedance, in the absence of constant or any voltage at the output of the regulator circuit. The switching element is preferably a semiconductor device having a control electrode coupled to the output of the regulator circuit and switching electrodes coupled to the capacitor and the relay coil to control current flow from the capacitor through the relay coil. Means are provided for maintaining the switching element in the proper state, as discussed above, during charging and discharging of the capacitor. In the preferred embodiment, such means comprises a diode interposed between the regulator circuit and the capacitor.

According to the preferred embodiment, the threshold means is coupled to the line through the switch means.

When utilized as a remote isolation device, the invention provides the following advantages. The line linking the two locations is seized for testing only for the time determined to be necessary for carrying out testing. Switching apparatus can then be provided having a temporary switch condition corresponding identically or closely to the required testing time. In addition, the activating and/or de-activating remote signal for the remote isolation device need only be applied for the precisely determinable time necessary to energize the energy storage means to a preselected level.

The above and other objects, aspects, features and advantages of the invention will be more readily perceived from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 5 is a circuit diagram of a remote isolation device according to the embodiment of FIG. 3.

DESCRIPTION OF THE PREFERRED EMBODIMENTS

With reference now to the drawings, remotely-activated apparatus, referred to in a non-limiting sense as remote isolation devices, are illustrated. Although remotely-activated apparatus are illustrated and described in association with operation from and in cooperation with a telephone line for disconnecting said connecting equipment and apparatus to the telephone line at a telephone subscriber's facility, it is to be understood that the invention is not limited to such use, which is described in an exemplary sense. For example, the invention is applicable to be used in communication, control, security systems, etc. telephone systems and other systems, and is adapted to be connected to links other than telephone lines, for example microwave or other radio or electromagnetic links or light energy links, etc. Moreover, the term "telephone company" is meant in a general and broad sense.

Figure 1:
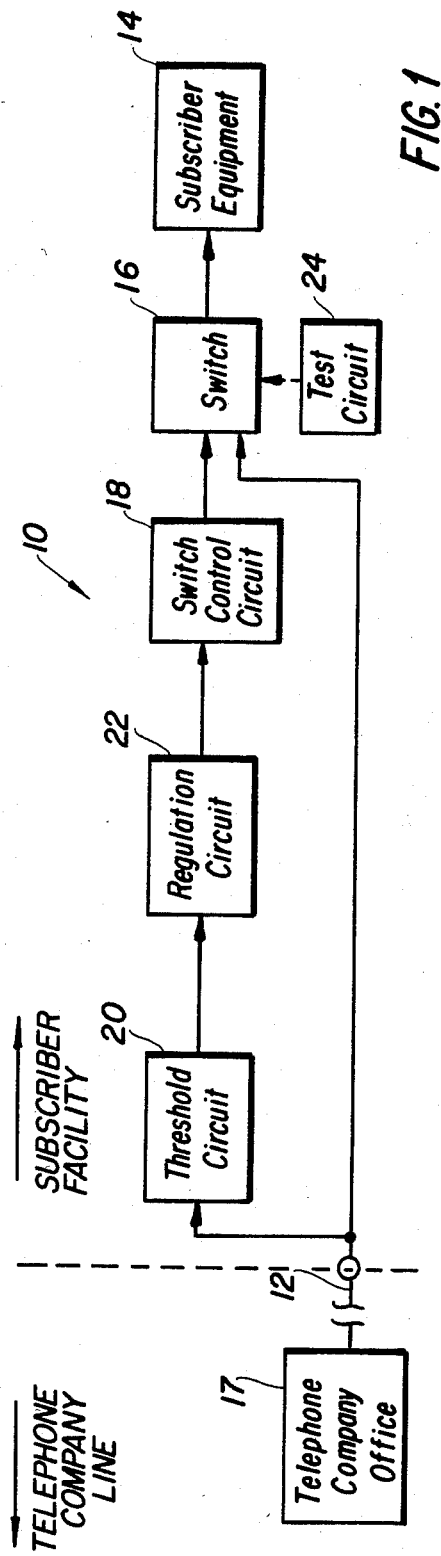
FIG. 1 is a block diagram of a remote isolation device according to one embodiment of the invention.

The remote isolation device 10 depicted in FIG. 1 is connected between a telephone company line 12 and subscriber equipment 14. The telephone company line 12 is coupled to the subscriber equipment through a switch 16, which could be a relay or a solid state switch, for example. The switch 16 is controlled by switch control circuit 18 which is coupled to the telephone company line 12 through a threshold circuit 20 and a regulation circuit 22.

The switch control circuit 16 includes an energy storage element which is energized by a signal sent from a telephone company office 17 over the telephone company line 12. The switch control circuit 18 controls energization and de-energization of the energy storage element and thereby activation of the switch 16. The threshold circuit 20 provides an output signal of sufficient magnitude or energy to the regulation circuit to cause activation of the device only when the telephone company signal sent over the telephone company line exceeds a predetermined value. The threshold circuit thereby ensures that a signal will not be provided to the regulation circuit unless a proper energizing signal is received from the telephone company by the remote isolation device, thereby avoiding activation of the remote isolation device in response to normal communication signals or spurious signals below the threshold level of circuit 20. Moreover, the threshold circuit 20 ensures that the remote isolation device will not be tripped unless there is sufficient energy in a telephone company signal to cause proper disconnection and re-connection of the subscriber equipment.

The regulation circuit 22 provides a regulated output signal to the switch control 18 in response to the output signal from the threshold circuit. The regulated output of the regulation circuit acts as an energy source which supplies energy to the energy storage element at a constant output not only during energization of the energy storage element for any particular activation of the device, but also from one activation to another. As a result, maintenance of the energizing signal from the telephone company office to the remote isolation device for a given time will energize the energy storage element to a given, repeatable level, which in turn can be used to maintain the switch in a switched state for a given repeatable time period during which the subscriber equipment is disconnected and testing of the telephone company line from the telephone company office to the subscriber's facility can be carried out in known manner.

The switch control circuit 18 is structured so that the state of the switch 16 is changed only after the telephone company energizing signal has been removed. The switch control circuit 18 thereby enables the precise time at which the energy storage means commences de-energizing to be accurately determined and controlled. The switch control circuit 18 and the regulation circuit 22 thereby enable the times associated with switching to be repeatably accurately determined and controlled.

In the embodiment of FIG. 1, the threshold circuit 20 is connected directly to the telephone company line 12 and remains connected thereto regardless of the state of switch 16.

Figure 2:
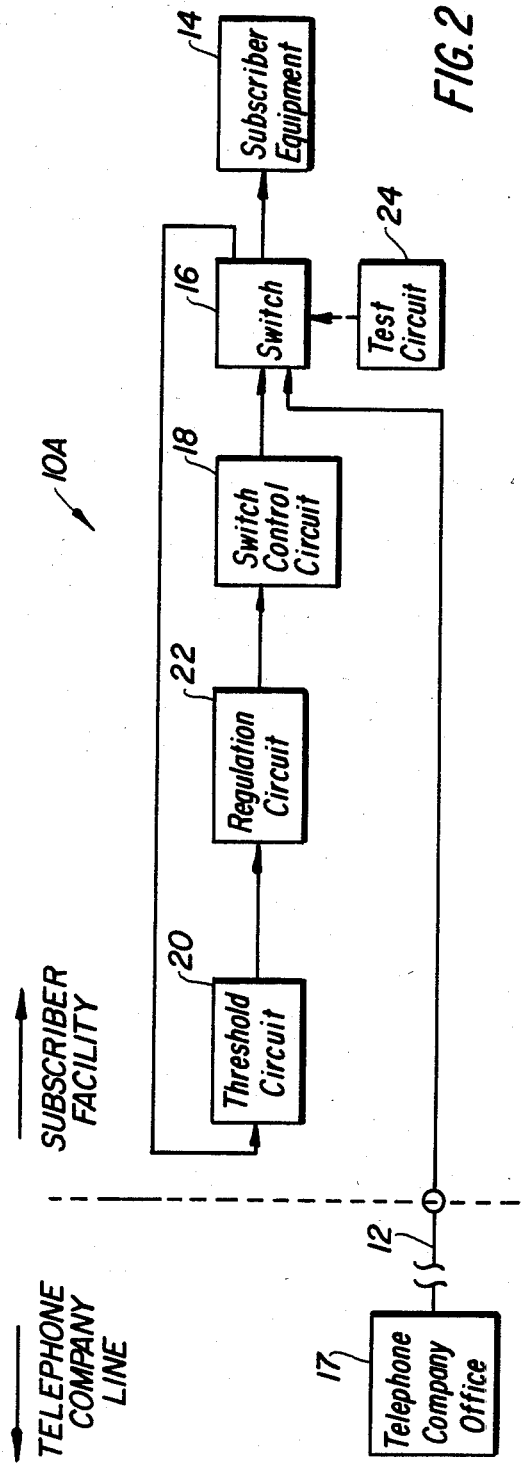
FIG. 2 is a block diagram of a remote isolation device according to another embodiment of the invention.

In the embodiment of the remote isolation device 10A depicted in FIG. 2, the threshold circuit 20 is connected to the telephone company line 12 through the switch 16 so that the remote isolation device is connected to the telephone company line when the subscriber equipment is connected, and disconnected when the subscriber equipment is disconnected. As a result, none of the circuits 20, 22 and 18 of the remote isolation device is connected to the telephone company line when the subscriber equipment is disconnected and the telephone line is being tested from the telephone company office. In addition, this arrangement allows the switch itself to be tested from the remote location. Moreover, a subsequent energizing signal sent from the telephone company office will have no effect on the remote isolation device while it is disconnecting the subscriber equipment. Therefore, the device cannot be re-activated until it has first been de-activated. This ensures complete cycling and hence repeatability.

Disconnecting the remote isolation device from the telephone line during testing provides for a total separation of circuit elements from the telephone line at the subscriber end. Such separation enables utmost testing of the telephone line with high accuracy while not requiring sophisticated test equipment which would otherwise have to take into consideration any circuit elements left connected to the telephone line at the subscriber end. Alternatively, using sophisticated equipment, sophisticated tests of the telephone line can be made at the highest accurancies. Complete disconnection at the subscriber end also avoids any inaccuracies which may be introduced from one test to another by different circuit elements connected to the line, or variances in circuit elements connected to the line, or by variances in energy levels of circuit elements connected to the line. For example, tests conducted with a device in which a capacitor remains connected to the line before and after activation of the switch could produce different, inaccurate or non-repeatable test results because of different charge levels of the capacitor from test to test.

Figure 3:
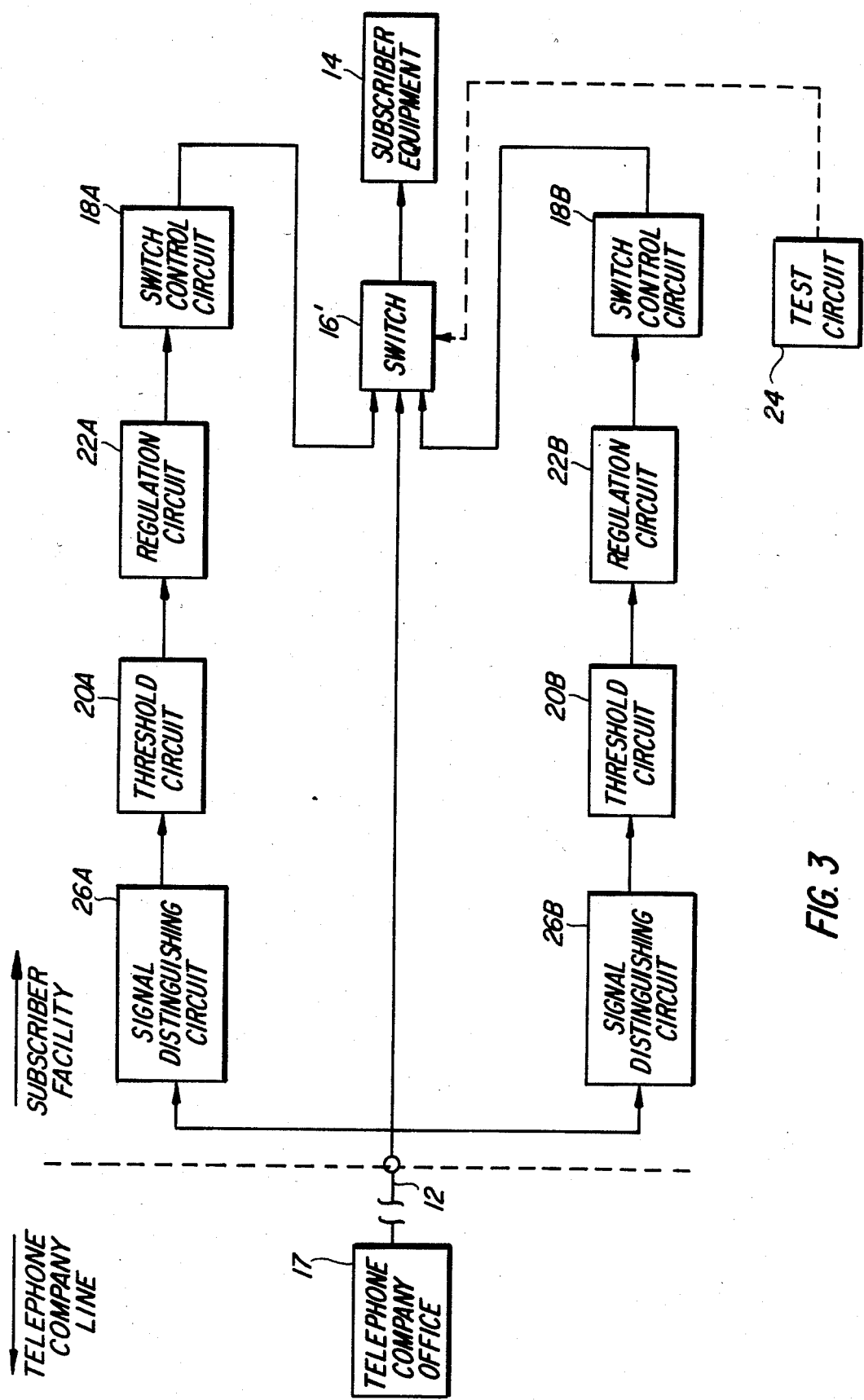
FIG. 3 is a block diagram of a remote isolation device according to another embodiment of the invention.

In the remote isolation device 10C in FIG. 3, the switch 16' is switched in response to a remote signal and maintained in the switched state until switched back by another, different remote signal. One remote signal causes switch 16' to be switched via threshold circuit 20A, regulation circuit 22A and switch control circuit 18A while the other remote signal causes switch 16' to be switched via threshold circuit 20B, regulation circuit 22B and switch control circuit 18B. Each of these circuits in the remote isolation device 10C of FIG. 3 can be similar or identical to the circuit with the corresponding number in the devices of FIGS. 1 and 2. The remote isolation device 10C further includes signal distinguishing circuits 26A, 26B which distinguish between the two remote signals which can, for example, be of different polarity. Alternatively, the regulation and/or threshold circuits can be set to operate from remote signals of different levels. The remote isolation device of FIG. 3, like that of FIG. 1, remains connected to the telephone company line at all times.

In the embodiments of FIGS. 1-3, a test circuit 24 can be connected to the switch 16 or 16' and thereby coupled to the telephone company line 12 during line testing when the subscriber equipment is disconnected. The test circuit 24 can be a passive line termination or an active circuit for transmitting a signal from the subscriber's facility to the telephone company office.

Figure 4:
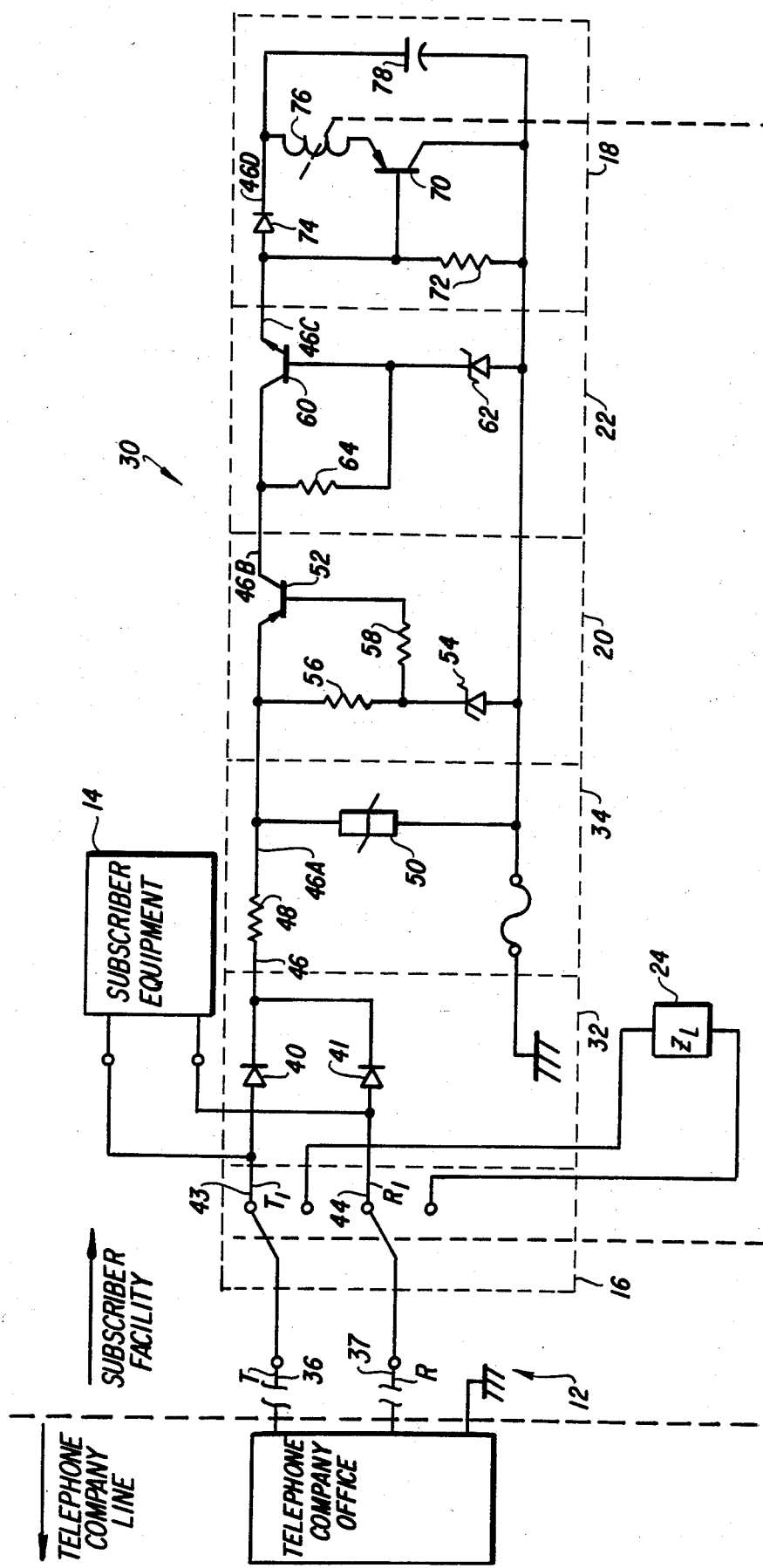
FIG. 4 is a circuit diagram of a remote isolation device according to the embodiment of FIG. 2.

The remote isolation device 30 depicted in FIG. 4 is connected to the telephone company line 12 generally as shown in FIG. 2. The remote isolation device 30 includes the switch 16, the test circuit 24, the switch control circuit 18, the regulation circuit 22, the threshold circuit 20, and in addition, a reverse polarity protection circuit 32 and a surge protector 34. The telephone company line 12 is comprised of a tip line 36 (T) and a ring line 37 (R).

The remote isolation device 30 operates from a direct current signal of either positive or negative polarity sent over the telephone company tip 36 and/or ring 37 line and earth ground. Preferably, the direct current signal is a voltage signal, preferably of 130 v magnitude corresponding to the coin collect or return voltage normally available at a telephone company office. While not intending to limit the scope of the invention, the circuit of FIG. 4 will be described with respect to operation from positive 130 v DC, although, as mentioned, other signals could be used. The particular components necessary for operation with such other signals will be perceived by those of skill in the art upon an understanding of the operation of the circuit of FIG. 4, as described below.

The reverse polarity protection circuit 32 comprises diodes 40 and 41 one terminal each of which is connected to respective terminals 43 ($T_1$) and 44 ($R_1$) of switch 16 so as to be normally connected through the switch to the telephone company tip and ring lines. The other terminal of both diodes is connected to a voltage input line 46 of the device. The cathodes of the diodes are connected together and to the voltage input line 46 so that the remote isolation device operates from a positive voltage on either or both the tip 36 and ring 37 lines and is protected from a negative voltage on either or both of those lines, although the device could be structured to operate from a negative voltage in which case the anodes of the diodes will be connected together to line 46. Other polarity protection circuits could also be used.

The surge protection circuit 34, comprising a resistor 48 and a varistor 50, is connected to the voltage input line 46. Resistor 48 is a limiting resistor connected in series with line 46 and varistor 50 is connected in shunt with the voltage input line referenced now be 46A. The surge protection circuit protects the remote isolation device from voltage peaks and surges which occur, for example, from lightning by shunting current through the varistor 50 whose resistance decreases with increasing current. Circuit 24 also protects the remote isolation device from abnormal level AC signals which may be present on the tip and/or ring lines. Such an abnormal AC signal could be put on the tip and/or ring lines if a telephone line and a power line were to be crossed as a result of a storm, etc. Substantially unlimited power could then be delivered to the remote isolation device before the protective circuit normally provided by the telephone company at the subscriber facility became effective. Advantageously the varistor 50 is selected to fail in the shorted state so that all the current on line 46A is shunted to ground, thereby protecting all of the circuitry downstream of the varistor. For further protection, resistor 48 is selected to fail in the open state, thus acting as a fuse. Other surge protection circuits could also be used.

The voltage threshold circuit 20 is coupled to the surge protection circuit 34 and comprises a transistor 52 disposed in series with the voltage input line 46A. Conduction of the transistor is controlled by a zener diode 54 coupled to the voltage input line 46A through a limiting resistor 56 and to the base of the transistor through another limiting resistor 58. Transistor 52 is an PNP transistor and having its emitter connected to the voltage input line 46A and providing an output at its collector, to which is connected the voltage input line, now referenced by 46B. When the voltage on the voltage input line 46A is less than the reverse breakdown or firing voltage of the zener diode 54, no current is drawn through limiting resistors 56 and 58 and transistor 52 is non-conducting. Thus, no voltage is supplied at the collector of transistor 52 to the voltage input line 46B. However, when the voltage on voltage input line 46A exceeds the firing voltage of the zener diode 54, the zener diode conducts and current is drawn through resistors 56 and 58 to turn transistor 52 on. The voltage on the input line 46A is then essentially provided at the collector of transistor 52, i.e. at the voltage input line 46B. For operation with a 130 v DC actuating signal from the telephone company office, zener diode 54 can be selected to have a zener reverse breakdown voltage of about 100 v. The voltage threshold circuit 20 can be varied to utilize other semiconductor devices, or gas discharge tubes, or other devices, and other types of threshold circuits can be used.

The voltage regulation circuit 22 comprises transistor 60, zener diode 62 and resistor 64. The transistor 60 is connected in series with voltage input line 46B, and is thus a series pass regulating element. The collector of transistor 60 is connected to the voltage input line 46B and the emitter of the transistor is the output of the regulation circuit, to which is connected the voltage input line, now referenced by 46C. The cathode of zener diode 62 is connected to base of transistor 60 and the resistor 64 is connected between the voltage input line 46B and the cathode of the zener diode 62. The voltage regulation circuit operates in known manner to provide a regulated voltage to line 46C which is essentially the reverse breakdown voltage of zener diode 62.

The firing voltage of the zener diode 62 is selected to be less than the firing voltage of the zener diode 54 of the threshold circuit so that the voltage regulation circuit will regulate over a wide range of voltages provided at the output of the threshold circuit. For operation with 130 v DC actuating signals, zener diode 62 can be selected to have a reverse breakdown voltage of about 51 v.

Modifications of the voltage regulation circuit shown in FIG. 4 are possible and other types of voltage regulation circuits can be used.

The switch control circuit 18 comprises a transistor 70, a bias resistor 72, a diode 74, a relay coil 76 and a capacitor 78. Transistor 70 is an PNP transistor connected generally in shunt with the regulated input voltage line 46C. The collector of transistor 70 is coupled to ground, the base to the biasing resistor 72 which is coupled to ground, and the emitter to a relay coil 76 which is connected to the regulated input voltage line 46C through diode 74, the regulated input voltage line at capacitor 78 being referenced by 46D. The capacitor 78 is connected across the series connection of the relay coil 76 and transistor 70 and therefore across the regulated input voltage line 46D. Relay coil 76 controls switch 16 causing it to switch between a normal operating mode in which the telephone company tip 36 and ring 37 lines are connected to the subscriber's equipment, and a test mode in which telephone company tip and ring lines are connected to test circuit 24.

The relay coil can be selected to have a energizing threshold level of 35 V, for example.

The embodiment of the remote isolation device depicted in FIG. 4 operates as follows. During normal operation, the switch 16 connects the telephone subscriber equipment 14 to the telephone company tip 36 and ring 37 lines. In addition, switch 16 connects the remote isolation device (reverse polarity protection circuit 32) to the telephone company tip 36 and ring 37 lines.

To activate the remote isolation device of FIG. 4, the telephone company office accesses the line to be tested and applies a given direct current voltage signal having a value dependent upon the circuit components used, e.g. 130 V DC, between the telephone company tip 36 and/or ring 37 line and ground. The reverse polarity circuit passes a positive voltage on the tip and/or ring line with respect to earth ground to the threshold circuit and prevents a negative voltage applied to either or both the tip and ring lines from being passed to the threshold circuit. Transistor 52 will turn on when the voltage across zener diode 54 exceeds its reverse breakdown voltage (e.g. 100 v) causing it to fire. The voltage at the output of the threshold circuit (line 46B) will then exceed the firing voltage of regulation circuit zener diode 62 (e.g. 51 v) and cause it to fire, thereby causing transistor 60 to provide a regulated voltage at line 46C to the capacitor 78 through diode 74. At this time, transistor 70 is turned off. The current through transistor 60 will pass through diode 74 causing capacitor 78 to charge. Since the voltage applied to the capacitor 78 is regulated and its value is known, the precise time required to charge the capacitor 78 is known. Thus, the voltage from the telephone company office need only be applied for the time required to fully charge capacitor 78, which time is known. While capacitor 78 is charging, transistor 70 remains non-conducting because the voltage at the base of transistor 70 is greater than the voltage at the emitter due to the voltage drop across forwardly-biased diode 74. Therefore, no current passes through the relay coil 76 and the switch 16 does not change its state, remaining in the condition shown in FIG. 4. Even after the capacitor 78 fully charges, transistor 70 will remain non-conducting until the voltage on input voltage line 46C falls below the voltage across capacitor 78 by a predetermined magnitude, i.e. a magnitude sufficient to back-biased diode 74. Thus, doide 74 maintains transistor 70 non-conducting when it is forward-biased, and conducting when it is back-biased even in the absence of voltage at the output of the voltage regulation circuit. Other semiconductor devices and other devices could also be used to maintain transistor 70 in the state desired. For example, a resistor could be used since it will provide the proper bias for transistor 70. However, a diode is preferred as it will isolate the capacitor as it is discharging and will substantially not dissipate energy as the capacitor is being charged. The diode 74 becomes back-biased, for example, when the energizing remote signal applied from the telephone company office is removed.

In order for capacitor 78 to discharge through relay coil 76 to cause the switch 16 to switch, transistor 70 must be turned on. This is accomplished by driving the voltage at the base of transistor 70 below its emitter voltage, which is achieved, as mentioned, by removing the voltage applied from the telephone company office to cause diode 74 to become back-biased. When the telephone company energizing voltage is removed, transistors 52 and 60 are turned off, and as the voltage at the base of transistor 70 drops, transistor 70 is turned on by the higher voltage present across the charged capacitor 78.

As the capacitor 78 discharges, diode 74 is back-biased and current is forced through relay coil 76 to maintain the switch 16 in the switch condition opposite to that shown in FIG. 4 connecting the telephone company tip and ring lines to the test circuit 24, while maintaining the subscriber equipment disconnected, thereby allowing the telephone company office to conduct tests for the known period of discharge of the capacitor 78.

Disconnecting subscriber equipment in this manner allows the telephone company office to conduct a variety of line quality tests independently of connections to the subscriber equipment, thereby isolating any problems experienced in the lines. According to one embodiment of test circuit 24, a known impedance is provided across the subscriber tip 43 and ring 44 lines, thereby allowing simple measurement of this known impedance as the test of line quality. The known impedance can be an open or short circuit, or can include capacitance, inductance and resistance. Such an impedance is passive in that it does not generate a signal but rather conditions, or reacts to, a signal sent from the telephone company office. Advantageously, a diode can be included as part of, e.g. in parallel or series with resistance, or constitute the impedance so that the impedance reacts differently to signals of opposite polarity. Thus, a resistive fault, which would provide the same reading with different polarity signals, can be detected. Alternatively, the line termination could be an active test circuit which generates a signal and sends it back to the telephone company office.

The voltage regulation circuit ensures that the capacitor 78 is charged from a known, repeatable voltage. Thus, the time to charge and discharge the capacitor can be accurately determined and the telephone company office can make certain that the energizing signal is applied for the known required time and that testing is concluded within the known discharge time period.

The combination of a threshold circuit, regulator circuit and capacitor provide a time constant to prevent the relay from reacting to false signals such as ring peaks and lightning.

When the switch 16 disconnects the subscriber equipment, it also disconnects the remote isolation device, as described in connection with FIG. 2, so that the remote isolation device does not receive any of the test signals which could possibly affect the tests being carried out, and can not be re-activated during a test. Although the remote isolation device is normally connected to the telephone company tip and ring lines, it does not load those lines because it has a high input impedance (e.g. 10 megohms or greater) when deactivated, as varistor 50 has a very high impedance, zener diode 54 is normally back-biased, and transistor 52 is normally non-conducting. In this state, the remote device draws essentially no power. At the same time, the remote isolation device 30 draws negligible current when it is activated e.g. less than about 80 ma as an initially fully discharged capacitor is being charged, only about 10 ma as the capacitor is almost fully charged, less than about 4 ma after the capacitor has been charged, and of course no current after the relay has disconnected the remote isolation device from the tip and ring lines. The current drain to the remote isolation device could be monitored to determine the state of the remote isolation device, if desired.

As discussed above, the times associated with charging and discharging of the capacitor, and hence switching times, can be determined (or set by selection of values) accurately. As a consequence, the precise time during which the remote signal must be applied to achieve switching or fully charge capacitor 78 is known. This can be of great value in an automated, e.g. computerized, test system in which a signal is sequentially applied for a predetermined time to each of a number of lines while the test system receives data for testing the lines.

Another embodiment of a remote isolation device 90 is depicted in FIG. 5. The remote isolation device 90 operates generally as described for device 10C of FIG. 3. The switch 16' includes a two coil latching relay 92 instead of relay 76 in FIG. 4. Otherwise device 90 is similar to device 30 except that device 90 essentially includes two devices 30, i.e. 30A, 30B, one for causing disconnection of the subscriber equipment and the other for causing reconnection of the subscriber equipment. Devices 30A and 30B are essentially the same as device 30 except that device 30B operates from a negative voltage. This is accomplished by reversing the ground and hot lines as compared to circuit 30 and connecting diodes 94,95 to the now reversed hot line 97 so as to pass a negative voltage from the tip and/or ring line to the hot line. The signal distinguishing circuit 26 in FIG. 3 can be embodied by the diodes 40, 41 in circuit 30A and diodes 94, 95 in circuit 30B. Thus, a voltage of one polarity will be passed by one circuit and a voltage of the opposite polarity by the other circuit. Each device 30A, 30B operates generally as discussed above for device 30, except that when the respective relay coil 99,100 is energized, the relay contacts remain switched until the other relay coil in the other device is energized.

The charging and discharging circuit for capacitors 78A, 78B in circuits 30, 30B is somewhat different from that of circuit 30. A diode 101 and a resistor 102 are disposed in parallel in the charging and discharging path for the capacitor. The diode is poled so as to be back-biased during charging, so that the resistor 102 is in the charging path. This enables the use of a smaller capacitor while preventing a quick charge due to spurious signals and maintaining the charging time constant. The diode 101 is however forward-biased during capacitor dicharge so as to shunt the resistor 102. The resistor 102 is therefore not in series with the relay coil 99, 100 during relay energization and does not dissipate energy or drop the voltage otherwise supplied to the respective coil. Different charging and discharging time constants are not a serious concern in the latching remote isolation device of FIG. 5 as the relay 92 is latched by the respective discharging capacitor.

In the embodiment of FIG. 5, diodes 94 and 95 are connected to the telephone company side of the relay so that circuit 30B is always connected to permit unlatching of the relay.

The remote isolation devices of FIGS. 4 and 5 can operate from a wide range of energizing signals by appropriate selection of components. For example, with zener diodes 54 and 64 having firing voltages of 100 v and 51 v, respectively, and appropriate selection of resistors and transistors, the devices of FIGS. 4 and 5 can operate from an activating voltage of from about 110 v to about 200 v. Similarly, by appropriate selection of capacitor 78, coil 76, diode 74, transistor 70 and resistor 72, precise charging and discharging times for a given regulated voltage at 46C can be determined. For example, for operation of the device of FIG. 4 from a 130 v activating signal, the charge time can be set to about four seconds and the discharge time to about 10 seconds.

It should be evident that the above components are merely illustrative and that various modifications and changes may be made thereto without departing from the spirit and scope of the invention as set forth in the appended claims. Furthermore, it should be recognized that energizing voltages other than 130 volts and reference voltages other than 51 volts in the voltage regulation circuit and 100 V in the voltage threshold circuit may be utilized merely by adjusting the type or values of the components used. Also, while a double pole, double throw relay switch has been illustrated in FIG. 4 and latching relays in FIG. 5, other switches may be used depending on the switching function desired.

Certain other changes and modifications of the disclosed embodiments of the invention will be readily apparent to those skilled in the art. It is the applicant's intention to cover by the claims all those changes and modifications which could be made to the embodiments of the invention herein chosen for the purposes of disclosure without departing from the spirit and scope of the invention.

What is claimed is:

1. A switching device adapted to be coupled to a line such as a telephone line and the like to connect or disconnect equipment connected to the line in response to a signal transmitted on the line from a location remote from the location at which the device is located, the device comprising a relay coupled to the line and to the equipment so as to connect and disconnect the line and the equipment in respective switching states of the relay, the relay having a coil which controls switching of the relay, voltage threshold means having an input coupled to receive voltage from the line and having an output for providing a voltage when the magnitude of the voltage at said input exceeds a threshold voltage magnitude and substantially no voltage when the magnitude of the voltage at said input is less than the threshold voltage magnitude, said voltage at the output of the threshold means being equal to or greater than a predetermined magnitude, voltage regulator means having an input coupled to the output of the voltage threshold means and an output providing a predetermined substantially constant voltage when said voltage magnitude is present at the output of the threshold means, a capacitor coupled to the output of the voltage regulator means adapted to charge when there is a voltage present at the output of the voltage regulator means, discharge means coupled to the capacitor including a diode coupled between the capacitor and the voltage regulator means, the discharge means enabling the capacitor to charge when the voltage at the capacitor is less than the voltage at the output of the regulator means and for discharging the capacitor through the relay coil in a predetermined time period when the magnitude of the voltage at the capacitor exceeds the magnitude of the voltage at the output of the regulator means, the relay coil being coupled to the discharge means and causing the relay to to be in one of the two states when the capacitor is discharging through the discharge means and in the other of the two states when the capacitor is not discharging through the discharge means.

2. The device according to claim 1 wherein the discharge means includes a switching element coupled to the relay coil to prevent current from flowing through the coil when the voltage at the capacitor is less than the voltage at the output of the regulator means and to permit current to flow through the relay coil when the voltage at the capacitor is greater than the voltage at the output of the regulator means.

3. The device according to claim 2 wherein the switching element is a semi-conductor having a control electrode coupled between the diode and the regulator means and its switching electrodes coupled in series with the relay coil and the capacitor.

4. The device according to claim 1 wherein the input of the voltage threshold means is coupled directly to the line.

5. The device according to claim 1 wherein the input of the voltage threshold means is coupled to the line through the relay.

* * * * *

UNITED STATES PATENT AND TRADEMARK OFFICE
CERTIFICATE OF CORRECTION

PATENT NO. : 4,558,182
DATED : Dec. 10, 1985
INVENTOR(S) : Steven B. Perry and Joseph Miller It is certified that error appears in the above-identified patent and that said Letters Patent is hereby corrected as shown below:

Col. 1, line 11, correct "betwen" to --between--.

Col. 3, line 62, correct "valve" to --value--.

Col. 4, line 7, after "result" insert --,--.

Col. 4, lines 39-40, delete "and/or the energizing means,".

Col. 6, line 62, delete "said" and insert therefor --and--.

Col. 8, line 30, correct "accurancies" to --accuracies--.

Col. 11, line 49, change "biased" to --bias-- and, same line, second occurrence, change "doide" to --diode--.

Col. 13, line 50, correct "dicharge" to --discharge--.

Signed and Sealed this

Third Day of June 1986

[SEAL]

Attest:

DONALD J. QUIGG

Attesting Officer

Commissioner of Patents and Trademarks